Feb. 11, 1969  G. BEHREND  3,427,196
PRODUCING ELECTRICAL CAPACITORS
Filed Sept. 3, 1963
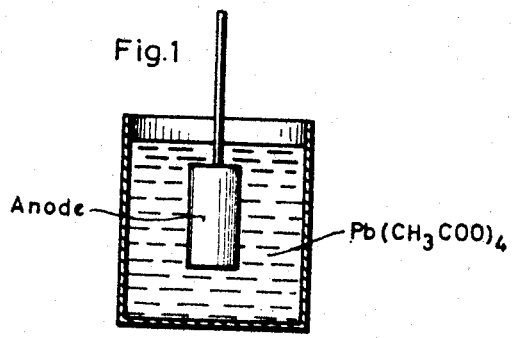
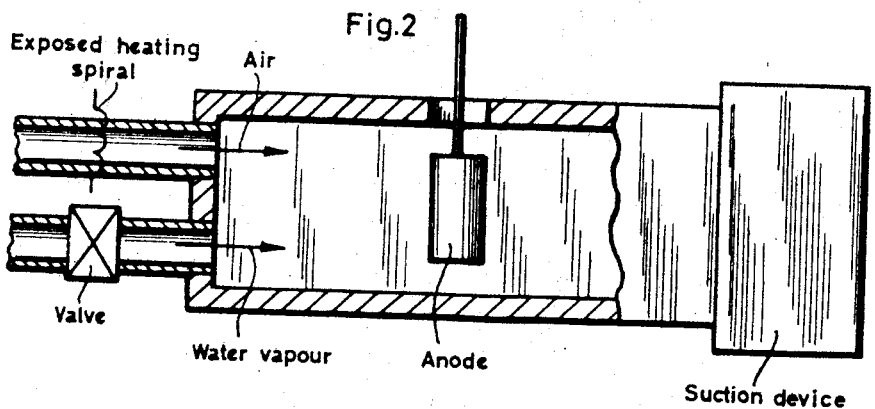
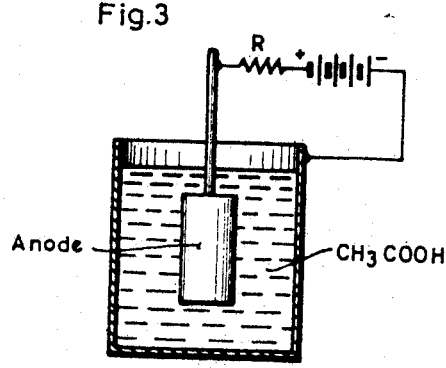
INVENTOR
*Gunter Behrend*
BY
*Hill & Hill*
ATTYS.

United States Patent Office 3,427,196
Patented Feb. 11, 1969

3,427,196
PRODUCING ELECTRICAL CAPACITORS
Günter Behrend, Heidenheim, Germany, assignor to Siemens Aktiengesellschaft, a German corporation
Filed Sept. 3, 1963, Ser. No. 306,383
Claims priority, application Germany, Sept. 6, 1962, S 81,324
U.S. Cl. 117—200    12 Claims
Int. Cl. H01g 9/05

The invention disclosed herein is concerned with producing electrical capacitors comprising, forming upon capacitor electrodes made of valve metal, by conversion of the valve metal, an oxide layer as a capacitor dielectric, and soaking or wetting the capacitor electrodes with a solution of a lead acetate, whereby lead acetate is precipitated upon the surface and in the case of sintered electrodes also in the interior thereof, and thereupon forming on the precipitated lead acetate a semiconducting oxide.

According to the invention, there is to be formed upon the valve metal electrodes, at relatively low reaction temperature, a semiconductor contacting layer with good specific electric conductivity and great oxidation power. All side products which are respectively required for the placing of the contacting substance or which are produced in the chemical reaction, shall be readily removable and shall not chemically attack the barrier layer and the semiconductor layer.

According to the invention, these requirements are met by soaking the electrodes with a lead (IV)-acetate solution and subjecting them to the flowing vapor of a hydroxyl-containing substance which may be diluted with a gas which is inert with respect to the reaction with lead (IV)-acetate. A mixture of water vapor and air has been found to be suitable for this purpose. According to the invention, there is produced upon anodes which are provided with an oxide layer, a finely grained, thin and firmly adhering coating of lead peroxide. The composition of the water vapor-air current is advantageously regulatable for the purpose of regulating the water vapor content so as to adjust the speed of conversion with avoidance of the formation of foam and bubbles which could bloat and loosen the contacting layer, thus making such layer useless. It is for the avoidance of bubbling and foaming advantageous to operate initially with low concentration of water vapor in the water vapor-air current and to increase such concentration during the conversion process. The drying of the anodes is effected in a heated air current with the water vapor supply disconnected.

Chloroform has been found suitable as a solvent for lead (IV)-acetate.

The invention is in several respects particularly advantageous. The treatment in a flowing mixture of water vapor (steam) and air volatilizes the solvent of the soaking liquid and also the acetic acid produced in the conversion. Accordingly, all side products appearing incident to the formation of the semiconducting layer are automatically removed already during the conversion process. The remaining residue can be readily removed with the heated air current during the drying of the anodes. Dry capacitors contacted with lead peroxide have as compared with dry capacitors contacted with manganese dioxide, lower values of apparent resistance, especially at higher frequencies, and also lower values of the loss factor, since lead dioxide (lead peroxide) has a better specific conductivity. Moreover, there can be expected a better residual current response, owing to the greater oxidation power. In addition, the use according to the invention, of a uniformly thin lead peroxide layer, results in the case of sintered anodes, as compared with anodes which are contacted with manganese dioxide, in a saving of space amounting to about 10 percent to 20 percent.

The following table presents a comparison of the electrical values of two different types of capacitors which are respectively contacted with lead peroxide and with manganese dioxide.

| Size | Contact Material | Capacitance (50 cycles) ($\mu f.$) | Loss Factor (50 cycles) (percent) | Apparent Resistance (10 kc.) ($\Omega$) | Apparent Capacitance at 10 kc. in (percent) of the 50 cycle value |
|---|---|---|---|---|---|
| 7.1 mm. $\phi$ x 16.5 mm | $PbO_2$ | 131.4 | 1.7 | 0.15 | 80.7 |
| | $MnO_2$ | 115.4 | 6.0 | 0.29 | 47.5 |
| 8.7 mm. $\phi$ x 19.1 mm | $PbO_2$ | 209.5 | 1.7 | 0.11 | 71.3 |
| | $MnO_2$ | 188.2 | 6.4 | 0.34 | 24.9 |

It will be seen from the table that capacitors contacted with lead peroxide have a lower apparent resistance, a higher capacitance and a lower loss factor. The values appearing in the table represent average values which were obtained by measurements involving in each case six capacitors.

The invention will now be explained more in detail with reference to the accompanying drawing, wherein FIG. 1 shows the step of soaking of anodes in an anhydrous lead (IV)-acetate solution;

FIG. 2 shows the treatment of anodes in a current of a mixture of air and water vapor; and FIG. 3 shows the forming of anodes in an aqueous acetic acid solution.

The anodes which are by forming provided with an oxide layer are immersed in an anhydrous lead (IV)-acetate solution (FIG. 1) and soaked or wetted with such solution. As shown in FIG. 2, the solvent of the lead (IV)-acetate solution is thereupon evaporated in a strong air current and the precipitated lead (IV)-acetate is in a stream of water vapor decomposed to lead peroxide and acetic acid. The air is supplied through a conduit in which it is heated by means of a heating spiral. Water vapor is supplied through another conduit provided with a valve for regulating the flow of water vapor. A suction device is provided for exhausting spent air and water vapor. The anodes which are in this manner provided with a lead dioxide layer or coating are as shown in FIG. 3 formed in a 1 percent to 2 percent aqueous acetic acid solution. The treatment according to FIGS. 1 and 2 is thereafter repeated.

An example will now be given to explain the invention more in detail.

Capacitor anodes made of tantalum are by anodic oxidation in aqueous phosphoric acid solution at 90° C. coated with a dielectric layer. The anodes are thereupon soaked at room temperature by immersion into the anhydrous solution of the lead (IV)-acetate. See FIG. 1. A solution of 20 g. lead (IV)-acetate in 100 m. dried chloroform is used for this purpose.

The soaking solution is produced as follows: 20 g. lead (IV)-acetate with the purity designation "purissium" are at room temperature dissolved in 100 ml. anhydrous chloroform with a degree of purity corresponding to DAB 6 (German standard). Commercially available chloroform always contains about 1 percent ethanol, which must be removed so as to avoid undesired decomposition of the lead (IV)-acetate.

The concentration of the lead (IV)-acetate solution must be corrected from time to time because the solvent evaporates slightly already at room temperature and also because the moisture contained in the air precipitates lead dioxide from the lead (IV)-acetate solution. The solution must be filtered in case of accumulating relatively large amounts of precipitated lead dioxide.

The solvent is evaporated in a strong air current (FIG. 2) and the lead (IV)-acetate precipitated from the solution upon the anodes, by the evaporation of the solvent, is thereafter decomposed to lead dioxide (lead peroxide) and acetic acid. According to the formula:

$$Pb(CH_3OOO)_4 + 2H_2O \rightarrow PbO_2 + 4CH_3COOH$$

In the event that the conversion is effected in saturated steam, there may appear foam formation owing to spontaneously escaping acetic acid vapors. The lead dioxide or peroxide layer will in such case swell and flake off. A finely grained, thin and firmly adhering layer or coating is however obtained upon carrying out the conversion in a water vapor-air current with initially slight and thereafter increased water vapor concentration, whereby bubbling and foaming are avoided. The amount of water vapor supplied is regulated by the valve shown in FIG. 2. The treatment in a flowing mixture of water vapor and air volatilizes the solvent of the soaking liquid and also the acetic acid produced in the conversion. The reaction requires from 5–20 minutes, depending upon the size of the anodes, and is completed when there is no acetic acid odor discernible in the exhaust steam. The water vapor (steam) supply is thereupon disconnected and the anodes are dried in an air current heated to 125° C. The outer film on the lead dioxide is thereafter wiped off, for example, with a suitable brush.

Following these treatments, the anodes are in customary manner formed at 90° in 1–2 percent aqueous acetic acid (FIG. 3) and thereafter dried at 125° C. for 10–20 minutes. The operations having to do with the soaking and decomposition of the lead (IV)-acetate as well as with the forming, are repeated several times so as to reinforce (strengthen and augment) the lead dioxide layer formed.

It was however found advantageous to omit forming after the last repetition of inversion and decomposition of the lead (IV)-acetate to lead dioxide, and to graphitize the anodes directly after the decomposition and subsequent drying. The anodes are thereby coated with a graphite layer, thereupon provided with copper vaporized thereon, and the copper coating is thereafter tinned.

The temperature shall be kept as low as possible during the mounting of the anodes in the respective housings since lead dioxide decomposes at 290° C.

Changes may be made within the scope and spirit of the appended claims which define what is believed to be new and desired to have protected by Letters Patent.

I claim:

1. A method of producing an electrical capacitor, comprising soaking with a lead (IV)-acetate solution a metallic capacitor electrode of valve metal which is provided with an oxide layer serving as a dielectric, to precipitate lead salt thereon, and thereupon subjecting the soaked electrode to the action of a flowing vapor of a hydroxyl-containing substance to convert the precipitated lead salt to a semiconducting oxide.

2. A method according to claim 1, comprising using for the soaking a solution of lead (IV)-acetate in chloroform.

3. A method according to claim 1, wherein said flowing vapor is diluted with a gas which is inert with respect to reaction with lead (IV)-acetate.

4. A method according to claim 1, wherein the soaked electrode is subjected to the action of a current of a mixture of water vapor and air.

5. A method according to claim 4, comprising applying initially a low concentration of water vapor in the mixture and increasing such concentration in the course of the conversion process.

6. A method according to claim 4, comprising drying the electrode in a current of heated air.

7. A method according to claim 6, comprising forming said dried electrode by subjecting it to the action of diluted acetic acid.

8. A method according to claim 7, wherein the steps of soaking, conversion to lead peroxide, drying and forming are repeatedly applied.

9. A method according to claim 7, comprising repeatedly applying the successive steps of soaking, conversion to lead dioxide, drying and forming, and finally repeating the respective successive steps except the forming step.

10. A method according to claim 9, comprising the step of mechanically removing after each conversion the outer film of the lead peroxide.

11. A method of producing an electrode for use in an electrical capacitor, comprising, taking an electrode which is provided with an oxide layer serving as a dielectric and repeatedly subjecting said electrode to the following successively applied steps, namely, first, soaking such electrode with an anhydrous lead (IV)-acetate solution to precipitate lead acetate thereon, second, subjecting said electrode to the action of a flowing stream of a mixture of air and water vapor with initially relatively low concentration of water vapor in said mixture and gradually increasing the concentration of water vapor in said mixture, whereby said precipitated lead acetate is converted into lead peroxide, third, drying said electrode in a current of heated air, and fourth, forming said electrode by subjecting it to the action of diluted acetic acid.

12. A method according to claim 11, comprising finally subjecting the electrode successively only to the first to third steps, thereafter providing on the electrode, after the drying thereof according to the third step, a coating of graphite, vaporizing on said graphite coating a layer of copper, and tinning said copper layer.

No references cited.

WILLIAM L. JARVIS, *Primary Examiner.*

U.S. Cl. X.R.

117—212, 217, 62; 317—230; 29—570